Oct. 3, 1961     G. A. SCOTT     3,003,048
AUTOMATIC MEAT THERMOMETER AND HEATER
Filed Dec. 21, 1959     2 Sheets-Sheet 1
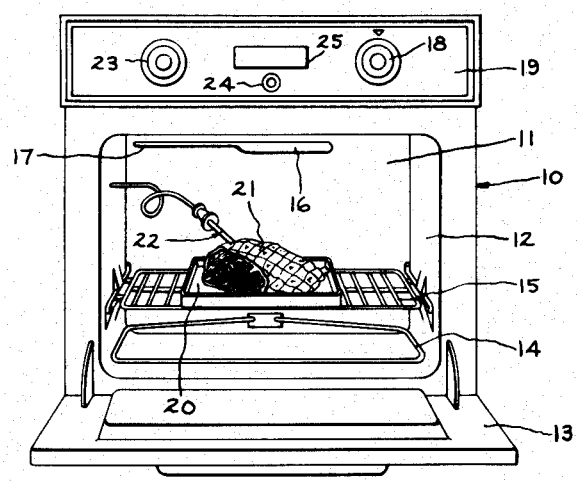
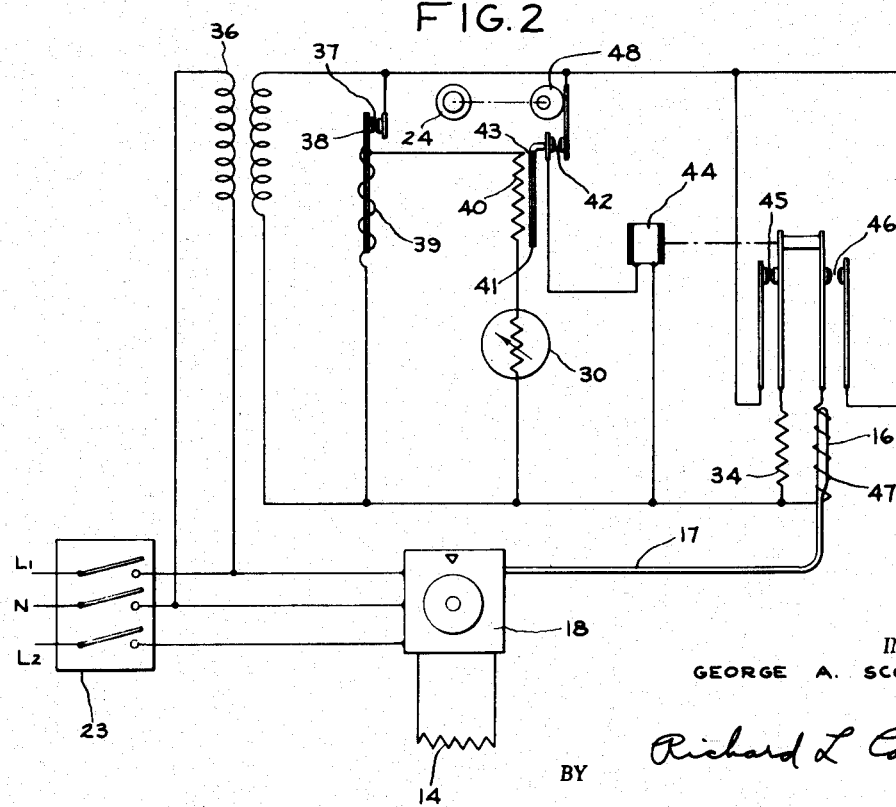
INVENTOR
GEORGE A. SCOTT
BY Richard L. Caslin
HIS ATTORNEY Oct. 3, 1961  G. A. SCOTT  3,003,048
AUTOMATIC MEAT THERMOMETER AND HEATER
Filed Dec. 21, 1959  2 Sheets-Sheet 2

INVENTOR
GEORGE A. SCOTT
BY Richard L. Caslin
HIS ATTORNEY

United States Patent Office 3,003,048
Patented Oct. 3, 1961

3,003,048
AUTOMATIC MEAT THERMOMETER AND HEATER
George A. Scott, Jeffersontown, Ky., assignor to General Electric Company, a corporation of New York
Filed Dec. 21, 1959, Ser. No. 860,884
8 Claims. (Cl. 219—20)

This invention relates to an improved oven control system for reducing the amount of time necessary for cooking roasts, poultry, casseroles and the like, and is particularly concerned with heating the food from both the inside as well as the outside by supplying controlled heat into the food.

Most meats are good thermal insulators so they must be cooked in an oven with relatively high oven temperatures to allow the heat energy to penetrate through the surface of the meat into the interior. It has been known that the cooking time of roasts can be reduced as much as 40% by sticking aluminum thermal-conducting pins into the roast. This invention concerns an improvement over the aluminum pins by introducing controlled heat directly into the interior of the meat while at the same time maintaining an oven temperature sufficiently high to properly brown the exterior.

The principal object of this invention is to provide a cooking oven for roasts and the like with means for introducing controlled heat directly into the food while at the same time maintaining proper oven temperature sufficiently high to cook the exterior of the food.

A further object of the present invention is to provide an automatic meat thermometer and heater having a temperature sensitive means for controlling the heater as well as maintaining the oven temperature at a gradually diminishing value as the food is being cooked.

A further object of the present invention is to provide a combined meat thermometer and heater in cooperation with an oven for introducing controlled heat into the interior of the food to be cooked so that the internal temperature never exceeds the correct final cooking temperature; as well as controlling the oven temperature to properly brown the exterior of the meat, while preventing overcooking and being capable of maintaining the meat at an acceptable serving temperature.

A preferred embodiment of this invention includes an oven with a combined meat thermometer and heater. This combined unit, which will hereinafter be referred to as a probe, has a temperature sensitive element in the tip thereof and a heater that extends for substantially the entire length of the probe. The probe is associated with a low voltage control circuit that incorporates a voltage regulator that supplies a constant voltage to a responder having normally open contacts. A thermistor or temperature sensitive element in the tip of the probe is in series with the responder so that as the temperature of the thermistor rises its resistance is reduced sending more current flowing through the responder until its normally open contacts are closed. The responder actuates a relay that includes two pairs of contacts, one pair is normally open while the other is normally closed. The normally closed relay contacts are in series with the probe heater while the normally open contacts are associated with an anticipator heater that is wound around the bulb of the oven thermostat.

In operation the oven switch is turned On to the bake position, the oven thermostat is set at the proper oven temperature which for all roasting operations is approximately 500° F. Then the control for the combined meat thermometer and heater is set at a temperature relating the desired doneness of the meat such as rare, medium or well done as indicated by suitable cooking instructions.

A step-down transformer is fed from the power supply lines to the oven and it provides an unregulated voltage of about 12 volts for the meat thermometer circuit. Connected across the secondary winding of the transformer is a voltage regulator that supplies a rapid pulsating voltage to the heaters of the control circuit and corrects the voltage for ambient temperatures and voltage changes to obtain uniform results under all operating conditions. Feeding from the voltage regulator is a bimetallic responder with normally open contacts and a thermistor that is in series with the responder. In series with the contacts of the responder is a relay for cycling the probe heater On and Off in response to signals from the thermistor. Simultaneously, the relay will cycle an anticipator heater that is wound around the bulb of the oven thermostat so that when the probe heater is de-energized the anticipator heater will be energized and vice versa. As soon as the oven is turned On the probe heater is energized through the normally closed contacts of the relay. At the same time the oven heating units are energized. When the probe and the surrounding meat reaches a pre-set temperature, the probe heater will cycle Off and On periodically due to the change in resistance of the thermistor as a function of the temperature of the thermistor causing a change in the current of the responder heater until its contacts close, thus energizing the relay. This continues until the meat is cooked at which time the thermistor calls for no additional heat, thus allowing the anticipator heater to remain On full time to lower the oven temperature to a proper serving temperature.

My invention will be better understood from the following description taken in connection with the accompanying drawings and its scope will be pointed out in the appended claims.

FIGURE 1 is a front elevational view of a built-in wall oven with the combined meat thermometer and heater that embodies the present invention only partly inserted into the meat.

FIGURE 2 is the circuit diagram of an oven control circuit embodying the present invention.

Figure 3:
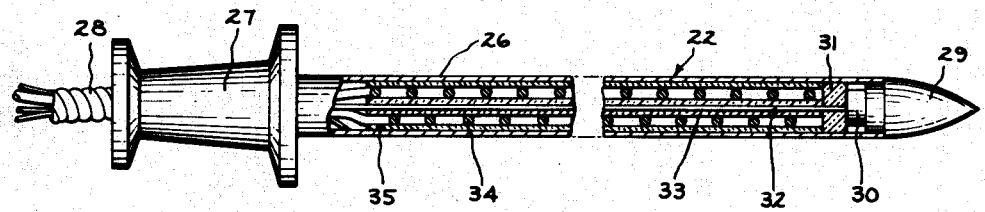
FIGURE 3 is a partial cross-sectional view of the combined meat thermometer and heater.

Turning now to a consideration of the drawings and in particular to FIGURE 1, there is shown a built-in wall oven 10 which incorporates a cooking oven 11 that is defined by a five-sided oven liner 12 that is open only at the front. A drop type oven door 13 is hinged along a horizontal axis at the bottom edge of the oven for gaining access to the oven and for closing the oven during cooking. A metal sheathed heating unit 14 or bake unit is supported in the bottom of the oven, and commonly there is an upper heating unit (not shown) which is termed the broil unit. One or more slide-in wire shelves 15 are supported from the side walls of the oven liner. A bulb 16 of an oven thermostat is supported on the back wall of the oven liner and connected by means of a capillary tube 17 to a thermostatic control device 18 that is mounted on the control panel 19 above the oven.

A broiler pan 20 is shown resting on the shelf 15 and it supports the food to be cooked such as a ham or roast 21. Inserted into the meat is a meat probe 22 that is illustrated in detail in FIGURE 3. Its function is to introduce heat into the interior of the meat as well as to control the heat of both the probe heater and the oven heating unit so that the oven will not overcook the meat once it has reached the required amount of doneness. The control panel 19 above the oven includes in addition to the thermostat 18, an oven control switch 23 and a probe control 24 that is associated with a dial indicator 25 so that the required amount of doneness of the meat for food to be cooked may be set by the probe control.

Reference will now be made to the design of the meat thermometer 22 by studying the detail drawing of FIGURE 3. The meat thermometer or probe 22 has a tubular shank 26 of stainless steel, an insulating handle 27 and a flexible electric cable 28 that is adapted to be plugged into an electrical connector (not shown) mounted on one side wall of the oven liner. The free end of the tube 26 is closed by a copper or aluminum tip 29. Directly behind the tip is a thermistor 30 which serves as the temperature sensitive element of the probe. A thermistor is a device which has a negative resistance-temperature coefficient. This means that as its temperature rises its electrical resistance decreases. It has a resistance range from about 400 ohms at 70° F. to 38 ohms at 200° F. A ceramic insulator 31 backs up the thermistor and it is provided with a small central opening so that a lead 32 that is soldered or otherwise electrically connected to the thermistor extends longitudinally through the probe for connection in the control circuit of FIG. 2. Enclosing the lead 32 is a small diameter ceramic tube 33. Its purpose is to insulate the lead 32 from a wound resistance heater 34 which spirals around the ceramic tube for nearly the entire length of the probe. Another tube 35 of fibrous insulating material or the like is inserted over the probe heater for insulating the heater from the shank 26 of the probe. While the details of the probe handle do not form part of the present invention it should be understood that it must provide a moisture proof seal to insure that the characteristics of the thermistor will not be changed by moisture that might otherwise enter the probe while it is being washed. While the shank of the probe is shown as tubular it could be designed with a knife blade shape for better heat transfer and ease of inserting the shank between ribs, etc.

Looking at the circuit diagram of FIG. 2, a three wire 240 volt power source is furnished for the oven. The oven unit control switch 23 is first installed across the power lines and it feeds to both the oven thermostat 18 and a step-down transformer 36. The oven thermostat is provided with the before-mentioned capillary tube 17 having the bulb 16 on its end. The action of the thermostat 18 controls the oven heating unit 14 that is connected thereto. When the oven heating unit control switch 23 is On and the bulb 16 is cool, the heating unit 14 will be energized, until the temperature of the bulb approximates the temperature setting of the thermostat 18.

Connected across the secondary winding of the transformer is a voltage regulator having normally closed contacts 37, and a bimetal member 38 with a heater 39 wound thereover. The voltage regulator provides a rapid pulsating voltage with a constant effective value and eliminates error due to ambient temperatures and voltage fluctuations. The voltage regulator 37 will deliver a root mean square voltage to the control circuit because its bimetal heater winding is directly across the power source when the contacts are closed. Joined in parallel with the bimetal heater 39 is a heater 40 of a responder 41 that includes a pair of normally open contacts 42, where the movable contact is supported on a bimetal member 43 that is associated with the heater winding 40. The operation of this responder will be described in detail hereinafter. Connected in series with the responder heater winding 40 is the thermistor 30 of the meat probe. As mentioned previously, the thermistor has a negative coefficient of resistance-temperature. Its resistance is high when the control circuit is first energized but as its temperature rises its resistance drops allowing an increased amount of current to flow through the heater winding 40 of the responder and causing the bimetal 43 to flex until the responder contacts 42 close.

In series with the responder contacts 42 is a relay 44 that has two sets of contacts 45 and 46. Contacts 45 are normally closed while contacts 46 are normally open. The movable contacts of both sets of relay contacts are connected together so that the contacts open and close alternately. In parallel with the normally closed contacts 45 is the probe heater 34, while in parallel with the contacts 46 of the relay is an anticipator heater 47 that is wound around the bulb 16 of the oven thermostat 18. This anticipator heater is shown in the wiring diagram of FIG. 2 although it is not illustrated in the pictorial view of the oven of FIG. 1 as the heater is too small to be seen in such a view. The meat thermometer control 24 is also illustrated in the circuit diagram as controlling a cam member 48 that positions one of the contacts of the responder so that the normally open contacts will be spaced apart by a variable distance depending upon the setting of the control.

The operation of the control circuit is as follows:

Adjusting the oven heating unit control switch 23 will close the line contacts and energize both the transformer 36 and the heating unit 14, if the oven thermostat 18 is pre-set to a given temperature setting such as 500° F. Moreover, the meat thermometer control 24 must be set to the desired amount of doneness of the food which spaces the gap between the responder contacts. As soon as the oven switch is turned On the probe heater is energized through the normally closed contacts 45 of the relay 44. When the probe and the surrouding meat reach the pre-set temperature the probe heater cycles On and Off in opposition to the anticipator heater 47 that is wound around the bulb of the thermostat. This is a result of the change in resistance in the thermistor or senser 30 due to the rise in temperature causing a change in the responder heater current until the responder contacts close. This in turn energizes the relay and cycles the probe heater periodically.

Figure 4:
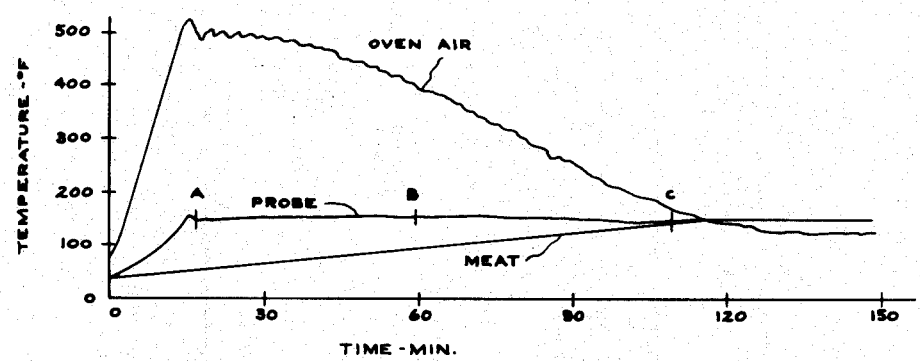
FIGURE 4 is a temperature vs. time graph showing the temperature gradients between the meat, and probe and the oven air.
Figure 5:
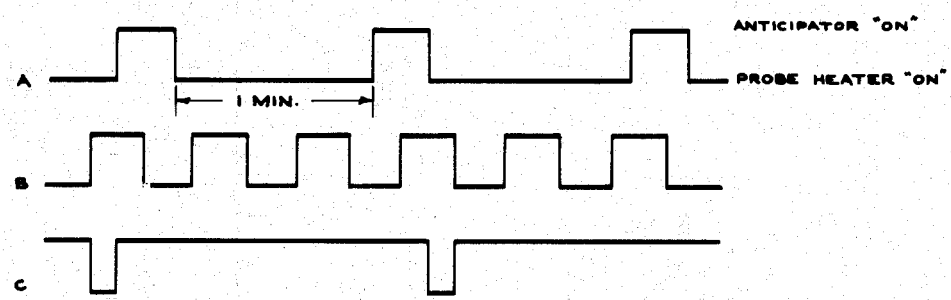
FIGURE 5 shows a group of three linear graphs showing the cyclic rate of the probe heater and anticipator heater as a function of time.

Consideration will now be given to the two graphs of FIGS. 4 and 5. FIG. 4 shows the temperature plotted against time and has three temperature curves namely the temperature of the meat, the temperature of the probe 22 and the temperature of the oven air. Notice that three marks are made on the temperature curve of the probe at A, B, and C. These three time intervals during the cooking operation are illustrated graphically in FIG. 5 to show the cycling operation of the probe heater and the anticipator at these three points. During the initial part of the cooking cycle the temperature gradient between the probe and the meat is large causing a slow heating of the probe and a fast cooling. Thus the probe heater is On most of the time while the anticipator heater is On only a short period of time as is illustrated in graph A of FIG. 5. As the meat cooks, the temperature gradient is reduced between the probe and the meat, thus the probe heater cycles on for a less percentage of the time as is indicated by linear graph B of FIG. 5. The anticipator heater is energized a greater percentage of the time thus biasing the thermostat and causing the oven temperature to drop as is indicated in FIG. 4. This continues until the meat is done at which time the probe calls for little heat thus allowing the anticipator to remain On most of the time as is illustrated in graph C of FIG. 5. With the anticipator heater On the oven temperature would be maintained at no more than 130° F. The rate of anticipation is such that the average oven temperature during any cooking cycle is approximately 350° F. When the anticipator is On almost full time the meat will not cook beyond the pre-set temperature but will be maintained at a suitable serving temperature for an extended time.

Having described above my invention of a combined meat thermometer and heater for use with an oven it will readily be apparent to those skilled in this art that the use of this invention will materially reduce the amount of time necessary for cooking roasts, poultry, meat pies, meat loaf and casseroles.

Modifications of this invention will occur to those skilled in this art and it is to be understood, therefore, that this invention is not limited to the particular embodiment disclosed but that it is intended to cover all modifications which are within the true spirit and scope of this invention as claimed.

What I claim as new and desire to secure by Letters Patent of the United States is:

1. An electric oven with means for supplying heat to the oven, an oven thermostat responsive to the temperature in the oven for controlling the supply of heat to the oven, an anticipator heater cooperating with the thermostat to bias the thermostat when the heater is energized to lower the oven temperature, a combined meat probe and heater element that is insertable into the food to be cooked, the probe comprising a temperature sensitive element for sensing and controlling the temperature of the probe heater by means of a thermally responsive cycling means which acts to alternately energize the probe heater and the anticipator heater once the temperature of the probe reaches a pre-set temperature, so that controlled heat is introduced directly into the interior of the food while the oven temperature is maintained sufficiently high to brown the exterior of the food properly, and the cooking time is reduced appreciably.

2. Apparatus for cooking a roast or the like comprising an oven adapted to receive the roast, means for supplying heat to the oven, and thermostatic means for manually selecting the oven temperature, a combined meat probe and heater that is insertable into the roast, the probe comprising a temperature sensitive element in the tip, and a heating element coiled within the probe so that controlled heat is introduced directly into the interior of the roast while the oven temperature is maintained sufficiently high to cook the exterior thereof, and a low voltage control circuit for the combined meat probe and heater comprising a voltage regulator for ambient temperature and voltage changes, the voltage regulator delivering a root mean square voltage to a responder that is in series with the temperature sensitive element in the probe, the responder having a pair of normally open contacts, the temperature sensitive element having a negative coefficient of resistance so that as the temperature rises the resistance will decrease so that more current will flow through the responder to close its contacts, and a relay that is actuated by the closed contacts of the responder to open the circuit to the probe heater and simultaneously close a circuit to an anticipator heater that cooperates with the thermostatic oven control, the probe heater and anticipator heater being cycled alternately between the ON and OFF positions, thus biasing the thermostatic means and causing the temperature in the oven to drop until the oven temperature reaches a serving temperature which may be maintained for an extended time.

3. An oven with means for supplying heat to the oven, an oven thermostat responsive to the temperature in the oven for controlling the supply of heat thereto, a combined meat probe and heater that is insertable into the food to be cooked, the probe including a shank with a temperature sensitive element in the tip, and a heater element extending for nearly the entire length of the shank, the oven thermostat including an anticipator heater that is alternately energized when the probe heater is de-energized, and relay means controlled by the temperature sensitive element of the probe through a thermally responsive cycling means for cycling the probe heater while simultaneously cycling the anticipator heater in an opposed relation, whereby when the probe heater is ON the anticipator heater is OFF so that as the food cooks the temperature gradient between the probe and the food is reduced and the probe heater cycles ON for less time and the anticipator heater is energized a larger percentage of the time thereby biasing the thermostat and causing the temperature in the oven to drop gradually from a high initial temperature to a final serving temperature during the entire cooking cycle.

4. A combined meat thermometer and heater comprising a metal shank and an insulating handle portion at one end of the shank, the shank including a temperature sensitive element at the end opposite the handle and a heater member extending for nearly the entire length of the shank, an electric cable connected to the handle and having lead wires joining with the said temperature sensitive element and the heater.

5. A combined meat thermometer and heater as recited in claim 4 wherein the temperature sensitive element is a thermistor with a negative coefficient of resistance and the heater is a spiral member that is wound over a central insulating core, a lead wire for the thermistor extending through the middle of the said central core, and an insulating sleeve assembled over the heater to insulate the heater from the metal shank.

6. An oven with thermostatic means for supplying controlled heat to the oven, and probe means for supplying controlled heat to the interior of the food to be cooked, the said probe means comprising a combined meat thermometer and heater with a metal shank and an insulating handle, the shank including in the tip a thermistor with a negative coefficient of resistance that is connected by leads extending from the shank and through the handle to an electric cable joined to the handle, and a spiral heater positioned within the shank and insulated from the thermistor and its leads as well as from the metal shank.

7. Means for cooking a roast or the like in a minimum of time comprising an oven, an electrical resistance heating circuit for supplying heat to the oven and including thermostatic control means for maintaining the oven at a controlled temperature, heating means insertable into the roast and connected to a control circuit, temperature sensitive means associated with the heating means, and an anticipator heater associated with the said thermostatic control means, the said heating means and the anticipator heater being cycled in opposition to the other between ON and OFF positions, the temperature sensitive means controlling the cycling of the two heaters through a manually adjustable thermally responsive cycling device which actuates a switching means common to both heaters for introducing controlled heat directly into the interior of the roast while maintaining the oven temperature sufficiently high to brown the exterior of the roast.

8. Means for cooking a roast or the like as recited in claim 7 wherein the temperature sensitive element is a thermistor with a negative coefficient of resistance, the thermally responsive cycling device is a heated bimetal responder that is in series with the thermistor, the responder having a pair of normally open contacts, so that a rise in temperature of the thermistor to a pre-set temperature determined by the adjustment of the responder will cause more current to flow in the responder to flex the bimetal and close the contacts, a relay in series with the responder contacts and being actuated thereby, the relay being joined with both said heating means and the anticipator heater for cycling the two heaters in opposition to each other, thereby reducing the normal cooking time by as much as 40 percent.

References Cited in the file of this patent

UNITED STATES PATENTS

| | | |
|---|---|---|
| 2,835,480 | Perez | May 20, 1958 |
| 2,846,556 | Whinery | Aug. 5, 1958 |
| 2,910,569 | Boddy | Oct. 27, 1959 |
| 2,914,644 | Holtkamp | Nov. 24, 1959 |